United States Patent Office 3,799,928
Patented Mar. 26, 1974

3,799,928
3-AMINO ALKYL-4-PHENYL-2(1H)-QUINOLONE DERIVATIVES
Ludwig H. Schlager, Polletistrabe 35,
Vienna XXII, Austria
No Drawing. Filed Sept. 16, 1971, Ser. No. 181,225
Claims priority, application Austria, Sept. 18, 1970, 8,462; Sept. 1, 1971, 7,605
Int. Cl. C07d 33/46
U.S. Cl. 260—268 BQ                5 Claims

ABSTRACT OF THE DISCLOSURE 3-aminoalkyl-4-phenyl-2(1H)-quinolones and physiologically acceptable acid addition salts thereof having the formula:

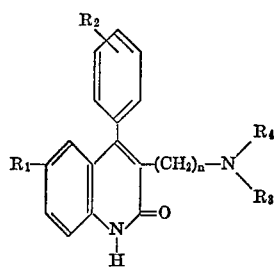

wherein $R_1$ and $R_2$ are independently selected from the group consisting of hydrogen, halogen, alkyl, alkoxy, trifluormethyl, cyano, nitro and alkylthio, $n$ is an integer from 1 to 9, and $R_3$ and $R_4$ are independently selected from the group consisting of hydrogen, alkyl, aralkyl, cycloalkyl, hydroxyalkyl, acyloxyalkyl or dialkylaminoakyl, or $R_3$ and $R_4$ together with the nitrogen atom form a heterocyclic ring which may include a second heteroatom selected from the group consisting of O, N and S, and when the second heteroatom is nitrogen, said nitrogen may be bound to an alkyl, hydroxyalkyl, acyloxyalkyl or acyl group, are useful as sedatives.

BACKGROUND OF THE INVENTION

1. Field of the invention

The invention relates to novel 3-aminoalkyl-4-phenyl-2(1H)-quinolone derivatives and a method for preparing same.

2. Description of the prior art

It is known from U.S. Pats. 3,066,145 and 3,202,661 that certain 3-amino-4-phenyl-quinolones, and from U.S. Pat. 3,509,156 that certain 3-acetamido-4-phenyl-quinolone derivatives have useful therapeutic effects.

SUMMARY OF THE INVENTION

According to the invention, there is provided a class of novel 3-aminoalkyl-4-phenyl-2(1H)-quinolones and physiologically acceptable acid addition salts thereof having the formula:

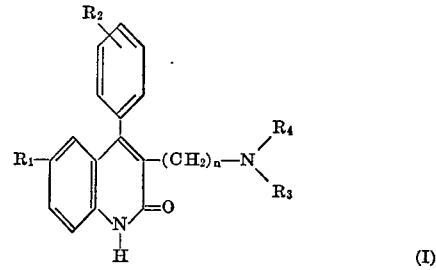

wherein $R_1$ and $R_2$ are independently selected from the group consisting of hydrogen, halogen, alkyl, alkoxy, trifluormethyl, cyano, nitro or alkylthio, $n$ is an integer from 1 to 9, and $R_3$ and $R_4$ are independently selected from the group consisting of hydrogen, alkyl, aralkyl, cycloalkyl, hydroxyalkyl, acyloxyalkyl or dialkylaminoalkyl, or $R_3$ and $R_4$ together with the nitrogen atom may form a heterocyclic ring which may include a second heteroatom selected from the group consisting of O, N and S, and when the second heteroatom is nitrogen, said nitrogen may be bound to an alkyl, hydroxyalkyl, acyloxyalkyl or acyl group.

The invention also provides a method for preparing these compounds from readily available starting materials.

According to the invention, the novel compounds are prepared by a method which comprises reacting a 2′-acylamidobenzophenone of the formula:

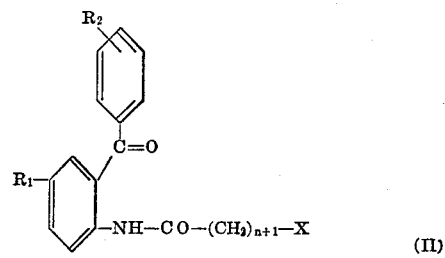

wherein $R_1$, $R_2$ and $n$ are as defined above and X is a halogen or a sulfonyloxy group with an amino compound of the formula:

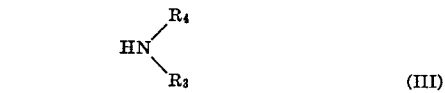

wherein $R_3$ and $R_4$ are as defined above, preferably in an inert solvent. The reaction results in the formation of a reaction product containing an intermediate of the formula:

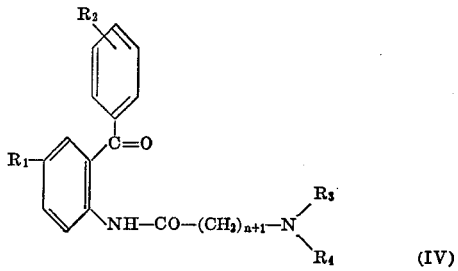

wherein $R_1$, $R_2$, $R_3$, $R_4$ and $n$ are as defined above. The intermediate may be isolated and then cyclicized by treatment with an alkali or with an agent which splits off water, such as acetic anhydride, to form the quinolone derivative of the Formula I. Alternatively, the quinolone derivative may be formed in situ, without isolation of the intermediate by effecting the ring closure directly upon the reaction product. In the case where $R_3$ or $R_4$ in Formula I is an acyloxyalkyl group, said group can be formed by acylation of a hydroxyalkyl group.

The intermediate compounds of the Formula IV are also novel compounds.

The starting materials of the Formula II are obtained by the reaction of a 2-aminobenzophenone having the substituents $R_2$ and $R_2$ as defined above with a straight-chain aliphatic ω-halo- or ω-sulfonyloxy carboxylic acid, an acid halide or anhydride thereof which contains two to ten methylene groups.

Examples of novel starting materials of the Formula II are set forth in Table A.

TABLE A.—DERIVATIVES OF FORMULA II

| $R_1$ | $R_2$ | $n$ | X | Melting point (° C.) |
|---|---|---|---|---|
| Cl | H | 1 | I | 96–98 |
| Cl | H | 3 | Br | 95–97 |
| Cl | H | 9 | Br | 64–66 |

The compounds according to the invention are useful as sedatives. In animal experiments, for example, it was found that compounds of Formula I have the ability to reduce spontaneous motility. Thus, in the case of mice using a compound of the Formula I wherein $R_1$ is chlorine, $R_2$ is H, $n$ is 1, and $R_3$ and $R_4$ together form a pentamethylene group, at an i.v. dose of 10% of the $LD_{50}$ there was observed a 50% reduction in spontaneous motility. When a correspondingly substituted compound of the Formula IV, in a comparable dose, was administered to mice, there was observed an increase in the motility of 136%. The measurement of spontaneous motility was carried out during a 15 hour observation period in an Animex apparatus. Moreover, in the fighting-mouse test of Yen and the rotating bar test of Dunham and Myia it was found that the compounds of Formula I have strong sedative properties, without, however, impairing coordination of movement in the test animals.

The compounds of the present invention are suitable for therapeutic use as sedatives, in the form of conventional galenic preparations.

It has also been found that when $R_3$ and $R_4$ form a heterocyclic ring including a second nitrogen atom and said second nitrogen atom is substituted with an acyl group, the obtained compounds have even better pharmacological properties than the compound described above.

DESCRIPTION OF THE PREFERRED EMBODIMENTS

The following examples describe the preparation of the present compounds using the method of the invention without, however, limiting the scope of the invention thereto.

Example 1

A solution of 9.7 g. of 2-(β-chloropropionylamido)-5-chlorobenzophenone and 6.4 g. of pyrrolidine in 50 ml. of isopropyl alcohol was boiled for 12 hours under reflux, then cooled and diluted with water and the precipitate which formed was removed by suction filtration. After recrystallization from ethanol/water, the precipitate melted at 212–213° C. and consists of 3-(1'-pyrrolidinomethyl)-4-phenyl-6-chloro-2(1H)-quinolone. The following equation illustrates the reaction:

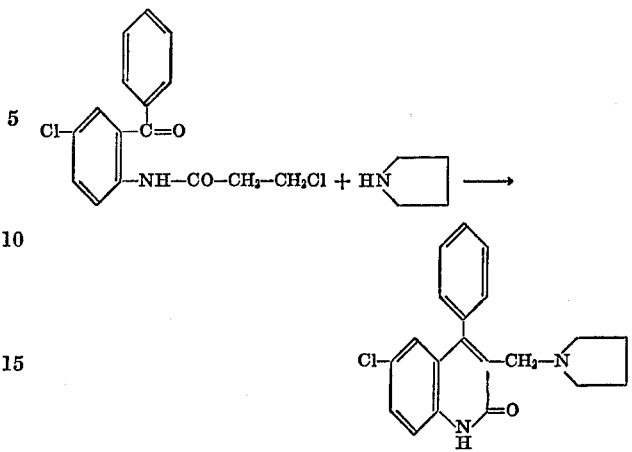

Example 2

(a) The 2-(β-iodopropionylamido)-5-chlorobenzophenone which is used as the starting material for this example, is obtained in the following manner:

285 g. of 2-(β-chloropropionylamido)-5-chlorobenzophenone and 146 g. of sodium iodide were stirred for 28 hours in 3000 ml. of isopropanol under reflux conditions. Filtration was effected while the solution was hot and the obtained filtrate was then allowed to cool, whereupon the iodine derivative crystallized out. Upon recrystallization from ethanol, the product melted at 96–98° C.

(b) 24.8 g. of the 2-(β-iodopropionylamido)-5-chlorobenzophenone and 23.4 g. of N-(β-hydroxyethyl)-piperazine were stirred in 50 ml. of isopropyl alcohol for 30 minutes at room temperature. Thereafter, the mixture was concentrated in vacuum, and the residue was dissolved in ethyl acetate. The ethyl acetate solution was washed several times with water and the ethyl acetate phase was then dried over $Na_2SO_4$, whereupon it was concentrated. As a residue there was obtained 2-{β-[$N^1$-(β-hydroxyethyl) - $N^4$ - piperazino]-propionylamido}-5-chlorobenzophenone which was then converted into the dihydrochloride with alcoholic HCl. The dihydrochloride, upon being recrystallized from ethanol/ether, melted at 190–195° C.

10 g. of the dihydrochloride obtained in this manner were dissolved in ethanol, treated with 61.4 ml. of 1 N NaOH and boiled for 30 minutes under reflux. The alcohol was then evaporated and the residue shaken with ethyl acetate. The ethyl acetate phase was then dried over $Na_2SO_4$ and concentrated. The residue, upon trituration with acetone, crystallized out and consisted of 3-[$N^1$-(β-hydroxyethyl) - $N^4$-piperazinomethyl]-4-phenyl-6-chloro-2(1H)-quinoline which, after recrystallization from acetone, melted at 200–203° C.

4 g. of 3-[$N^1$-(β-hydroxyethyl)-$N^4$-piperazinomethyl]-4-phenyl-6-chloro-2(1H)-quinoline were stirred in 100 ml. of boiling acetone. There was added to this solution, dropwise, a solution of 2.5 g. of 3,4,5-trimethoxy benzoyl chloride in 50 ml. of acetone and stirring was continued for 5 hours under reflux. The white finely powdered precipitate which formed was removed by suction filtration; it melted at 260–263° C. (with decomposition) and consists of 3-{$N^1$-[β-(3',4',5'-trimethoxy benzoyloxy)-ethyl]-$N^4$-piperazinomethyl}-4-phenyl - 6 - chloro-2(1H)-quinoline hydrochloride. The following equations illustrate the sequence of reactions in this example:

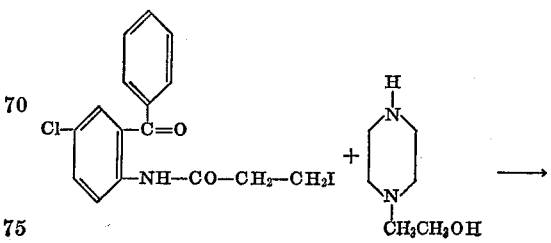

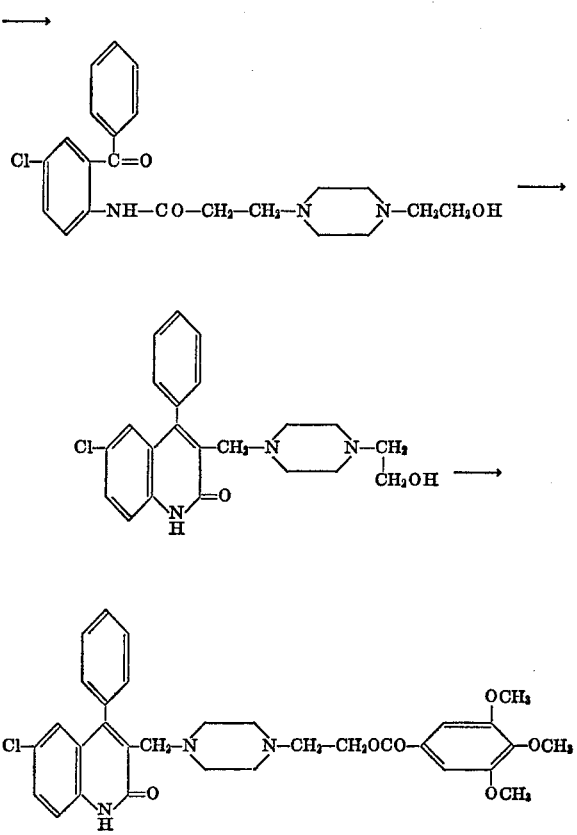

In accordance with the procedures of Example 1 or 2, other compounds of the Formulas IV and I were prepared and are listed in the following Table B. The temperatures designate the melting points in ° C. of the compounds as bases ("B"), hydrochlorides ("HCl") or dihydrochlorides ("2 HCl").

TABLE B

| $R_3$ | Compound of— | |
|---|---|---|
| | Formula IV [1] | Formula I [2] |
| —NH—CH₂CH₂OH | 173–179° (HCl) | 186–190° (B) |
| —NH—⌬ | 185–188° (HCl) | 277–230° (B) |
| —NH—CH₂CH₂N—(CH₃)₂ | 198–203° (2 HCl) | 157–159° (B) |
| —NH—CH₂CH₂N—(C₂H₅)₂ | 164–167° (2 HCl) | 140–142° (B) |
| —NH—(CH₂)₃—N(CH₃)₂ | 222–226° (2 HCl) | 165–167° (B) |
| —NH—(CH₂)₃—N(C₂H₅)₂ | 176–180° (2 HCl) | 134–135° (B) |
| —N⌬ | 94–96° (B) 179–18° (HCl) | 215–218° (B) 220–230° (HCl) |
| —N⌬ | 197–200° (HCl) | 215–218° (B) |
| —N⌬O | 177–181° (HCl) | 230–233° (B) |
| —N⌬N—CH₃ | 208–211° (2 HCl) | 220–223° (B) |

[1] $R_1$=Cl, $R_2$=H, $n$=1.
[2] $R_1$=Cl, $R_2$=H, $n$=1.

When $R_3$ and $R_4$ (in Formula I) form a heterocyclic ring including a second nitrogen atom and said second nitrogen atom is substituted with an acyl group, the preparation of the compounds is similar to that described above. That is, compounds of the Formula II and III are converted into a compound of the Formula IV, and thereupon a cyclization or ring closure of the type described above is carried out. However, one or more of the hydroxyalkyl groups which may be present or the substitutable hetero-N-atom which is present is acylated to form the N-acyl group, either before or after the ring closure step.

Of the compounds of the Formula II, the most preferred are 2-(β-chloropropionylamido) - 5 - chlorobenzophenone or 2-(β-iodopropionylamido)-5-chlorobenzophenone. The acylation of the hydroxyalkyl group(s) which may be present or the $$-N\diagdown NH$$

group is preferably effected with 3,4,5-trimethoxy benzoic acid or a reactive derivative thereof, such as the chloride or anhydride.

The following Example 3 describes the preparation of a compound containing two hetero nitrogen atoms, one which is acylated.

Example 3

(a) To a solution of 86 g. of anhydrous piperazine in 150 ml. of chloroform there was added dropwise, with agitation, a solution of 32.2 g. of 2-(β-chloropropionylamido)-5-chlorobenzophenone in 150 ml. of chloroform. The mixture was stirred for 2 hours at room temperature, then washed until neutral with water, and extracted with 150 ml. of 1 N HCl. The acid extract was extracted several times more with chloroform and then concentrated in vacuum. The residue crystallized upon heating with acetone. After suction filtration, washing with acetone and drying, there were obtained 38.9 g. of the dihydrochloride of 2 - [β-N¹-piperazino)-propionylamido]-5-chlorobenzophenone which melted at 173–180° C.

(b) The dihydrochloride obtained in (a) was dissolved in a small amount of water and the corresponding free base was liberated by the addition of NaOH. The base was extracted with 300 ml. of chloroform and the organic phase was dried over anhydrous Na₂SO₄. To the filtered chloroform solution there was added dropwise and with agitation, a solution of 30.1 g. of 3,4,5-trimethoxy benzoyl chloride in 50 ml. of chloroform. The mixture was set aside overnight and concentrated in vacuum and a residue was obtained in crystalline form by triturating with acetone. The crude product which had been filtered off was dissolved in about 400 ml. of 90% ethanol and the filtrate of said solution was diluted with 400 ml. of water. After cooling, 37.4 g. of 2-{β-[N⁴-(3′,4′,5′-trimethoxy benzoyl)-N¹-piperazino]-propionylamido} - 5 - chlorobenzophenone crystallized out in the form of the hydrochloride; melting pint 211–215° C.

(c) 30 g. of the hydrochloride obtained in (b) were heated with 100 ml. of 1 N NaOH in a mixture of 200 ml. of acetone and 100 ml. of distilled water for 30 minutes on a water bath under reflux. Thereafter, the acetone was evaporated in vacuum and the residue was extracted with chloroform. The chloroform solution, after being dried over anhydrous Na₂SO₄, was concentrated in vacuum and the residue crystallized by triturating with acetone. After reprecipitation of the crude product from ethanol/water, there were obtained 19 g. of 3-[N⁴-(3′,4′,5′-trimethoxy benzoyl) - N¹ - piperazinomethyl-4-phenyl-6-chloro-2(1H)-quinolone having a melting point of 235–236° C. The hydrochloride, prepared therefrom in a conventional manner, melts at 185–190° C. The following equations illustrate the reactions of Example 3:

[(a)]

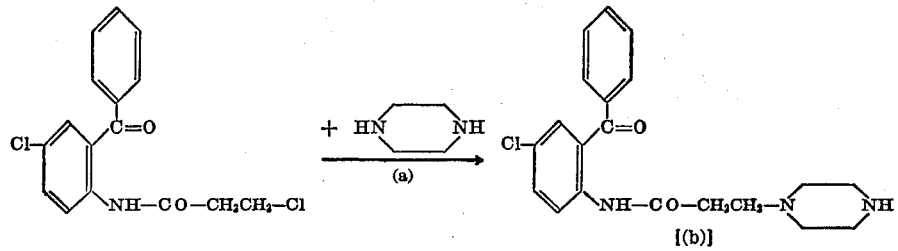

[(b)]

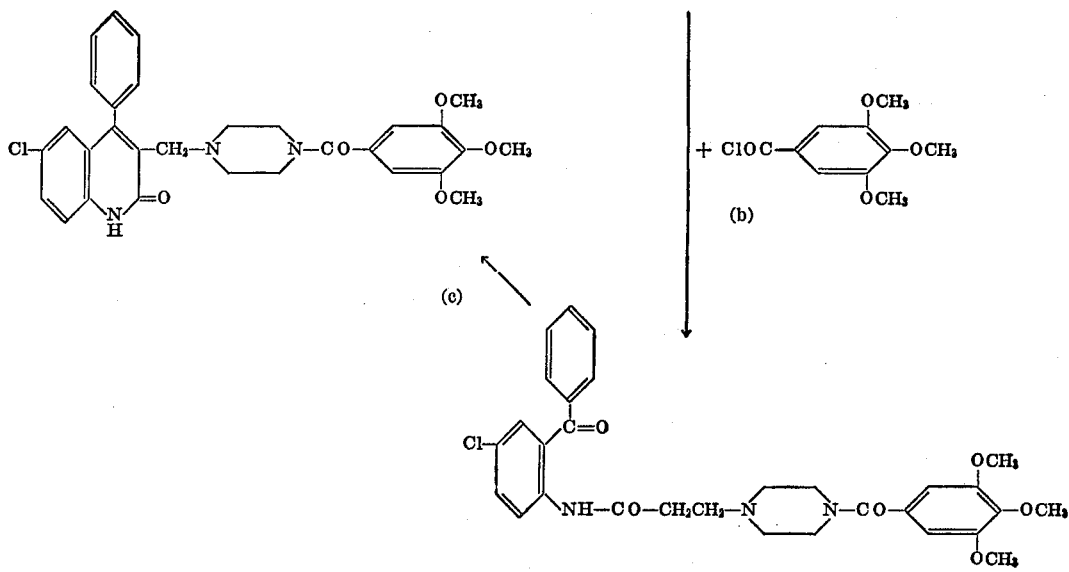

The hydrochloride of the compound of Example 3c lowers the spontaneous motility of mice by 63% with an I.V. dose of 10% of the $LD_{50}$ and thus, is particularly well tolerated. The $LD_{50}$ in mice for this compound is 310.5 mg./kg., I.V., and 480 mg./kg., I.P. In the fighting mouse test, this compound, upon I.P. administration, gives an $ED_{50}$ which corresponds to only 20% of the $LD_{50}$. In the case of this compound therefore the sedative activity is particuularly pronounced and it is in a favorable relationship to the toxicity.

Having thus described my invention, what I desire to secure by Letters Patent and hereby claim is:

1. A compound of the formula:

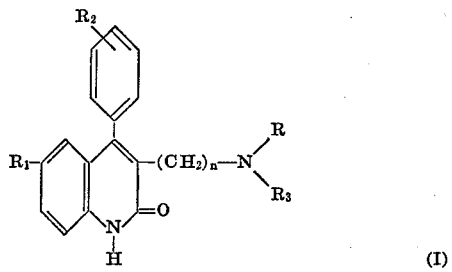

wherein $R_1$ is chlorine, $R_2$ is hydrogen, $n$ is 1, $R_3$ is hydrogen and $R_4$ is selected from the group consisting of

—$CH_2CH_2OH$, —$CH_2CH_2N(CH_3)_2$,

—$CH_2CH_2N(C_2H_5)_2$, —$CH_2CH_2CH_2N(CH_3)_2$,

—$CH_2CH_2CH_2N(C_2H_5)_2$, and

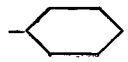

or $R_3$ and $R_4$ together with the nitrogen atom form a heterocyclic ring selected from the group consisting of

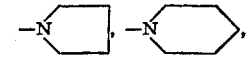

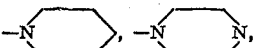

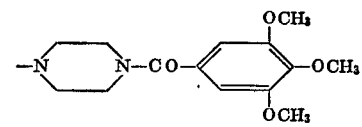

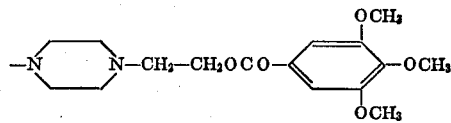

and

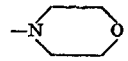

and physiologically acceptable acid addition salts thereof.

2. The compound as claimed in claim 1 wherein $R_3$ and $R_4$ together form a pentamethylene group.

3. The compound as claimed in claim 1 wherein $R_3$ and $R_4$ together form a tetramethylene group.

4. The compound as claimed in claim 1 wherein $R_3$ and $R_4$ together with the nitrogen atom to which they are bound, form a

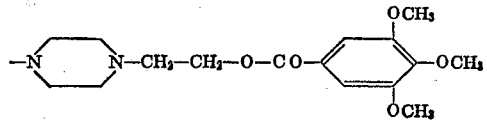

group.

5. The compound as claimed in claim 1 wherein $R_3$ and $R_4$ together with the nitrogen atom to which they are bound, form a

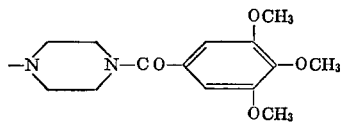

group.

References Cited

UNITED STATES PATENTS

| | | | |
|---|---|---|---|
| 2,901,485 | 8/1959 | Brody | 260—288 R |
| 3,551,413 | 12/1970 | Krapcho | 260—288 R |
| 3,574,216 | 4/1971 | Bell | 260—288 R |
| 3,577,430 | 4/1971 | Plostniers | 260—268 R |
| 3,660,084 | 5/1972 | Van Keertum | 260—287 C |
| 3,066,145 | 11/1962 | Suckowski | 260—288 R |
| 3,202,661 | 8/1965 | Brust et al. | 260—288 R |
| 3,267,103 | 8/1966 | Kraupp et al. | 260—268 C |
| 3,514,459 | 5/1970 | Ritten et al. | 260—288 R |
| 3,538,098 | 11/1970 | Bexerle et al | 260—268 BC |
| 3,541,097 | 11/1970 | Bexerle et al. | 260—268 BC |
| 3,682,920 | 8/1972 | Havera | 260—268 BQ |

FOREIGN PATENTS

| | | | |
|---|---|---|---|
| 1,019,311 | 11/1957 | Germany | 260—288 R |
| 1,932,384 | 1/1970 | Germany | 260—268 BQ |

DONALD G. DAUS, Primary Examiner

U.S. Cl. X.R.

260—243 B, 247.2 A, 268 R, 268 C, 288 R, 288 A; 424—248, 250, 258